(12) United States Patent
Hoogenboom et al.

(10) Patent No.: US 11,920,292 B2
(45) Date of Patent: Mar. 5, 2024

(54) METHODS FOR OBTAINING COLORED OR CHROMIC SUBSTRATES

(71) Applicant: UNIVERSITEIT GENT, Ghent (BE)

(72) Inventors: Richard Hoogenboom, Terneuzen (NL); Gertjan Vancoillie, Ghent (BE)

(73) Assignee: UNIVERSITEIT GENT (BE)

( * ) Notice: Subject to any disclaimer, the term of this patent is extended or adjusted under 35 U.S.C. 154(b) by 0 days.

(21) Appl. No.: 17/685,308

(22) Filed: Mar. 2, 2022

(65) Prior Publication Data

US 2022/0259799 A1    Aug. 18, 2022

Related U.S. Application Data

(62) Division of application No. 16/070,721, filed as application No. PCT/EP2017/051026 on Jan. 19, 2017, now Pat. No. 11,293,138.

(30) Foreign Application Priority Data

Jan. 19, 2016   (EP) ..................... 16151848

(51) Int. Cl.
| | | |
|---|---|---|
| *D06P 1/00* | (2006.01) | |
| *C08J 7/12* | (2006.01) | |
| *C09B 62/008* | (2006.01) | |
| *C09B 69/10* | (2006.01) | |
| *C09K 9/02* | (2006.01) | |
| *D06P 1/38* | (2006.01) | |
| *D06P 1/384* | (2006.01) | |
| *D06P 3/24* | (2006.01) | |
| *D06P 3/66* | (2006.01) | |
| *D06P 5/13* | (2006.01) | |
| *D06P 5/20* | (2006.01) | |
| *G01N 21/80* | (2006.01) | |
| *G01N 21/63* | (2006.01) | |

(52) U.S. Cl.
CPC ............. *D06P 1/0012* (2013.01); *C08J 7/123* (2013.01); *C09B 62/0081* (2013.01); *C09B 69/106* (2013.01); *C09B 69/109* (2013.01); *C09K 9/02* (2013.01); *D06P 1/38* (2013.01); *D06P 1/384* (2013.01); *D06P 3/248* (2013.01); *D06P 3/66* (2013.01); *D06P 3/666* (2013.01); *D06P 5/138* (2013.01); *D06P 5/2005* (2013.01); *D06P 5/2011* (2013.01); *G01N 21/80* (2013.01); *C08J 2301/02* (2013.01); *C08J 2323/06* (2013.01); *C08J 2323/12* (2013.01); *C08J 2327/18* (2013.01); *C08J 2377/00* (2013.01); *C09K 2211/1011* (2013.01); *D10B 2505/10* (2013.01); *D10B 2509/022* (2013.01); *G01N 2021/635* (2013.01)

(58) Field of Classification Search
CPC ........ D06P 1/0012; D06P 1/384; D06P 3/248; D06P 3/66; D06P 3/666; D06P 5/138; D06P 5/2005; D06P 5/2011; C08J 7/123; C08J 2301/02; C08J 2323/06; C08J 2323/12; C08J 2327/18; C08J 2377/00; C09B 62/0081; G01N 21/80; G01N 2021/635; C09K 2211/1011; D10B 2505/10; D10B 2509/022

See application file for complete search history.

(56) References Cited

U.S. PATENT DOCUMENTS

| | | |
|---|---|---|
| 8,649,081 B1 | 2/2014 | Demeio et al. |
| 11,293,138 B2 | 4/2022 | Hoogenboom et al. |
| 2005/0133697 A1 | 6/2005 | Potyrailo et al. |
| 2017/0275814 A1 | 9/2017 | Cornelius et al. |
| 2019/0032277 A1 | 1/2019 | Hoogenboom et al. |

FOREIGN PATENT DOCUMENTS

| | | | |
|---|---|---|---|
| EP | 1043365 A1 | 11/2000 | |
| WO | WO 2015/088920 A1 | 6/2015 | |
| WO | WO-2015088920 A1 * | 6/2015 | ........... D06N 3/0065 |

OTHER PUBLICATIONS

U.S. Appl. No. 16/070,721, filed Jul. 17, 2018, 2019/0032277, Jan. 31, 2019, U.S. Pat. No. 11,293,138, Apr. 5, 2022, Richard Hoogenboom, Methods for Obtaining Colored or Chromic Substrates.
International Preliminary Report on Patentability for PCT International Patent Application No. PCT/EP2017/051026, dated Jul. 24, 2018.

(Continued)

*Primary Examiner* — Irina S Zemel
(74) *Attorney, Agent, or Firm* — LATHROP GPM LLP

(57) ABSTRACT

The present invention provides a post-fabrication modification approach for the fabrication of colored and chromic materials and sensors using plasma surface modification to covalently bind the coloring agent to the substrate, thus avoiding leaching of the dye. Advantageously, in said methods, said coloring agent is a dye or pigment linked to a radical sensitive functional group, such as an alkenyl or alkynyl functional group, and is applied to the substrate prior to the gas plasma treatment. The methods envisaged herein are generic in nature, which allow the covalent immobilization of various dyes on different materials. The covalently coated materials after plasma surface modification, particularly the covalently coated chromic materials and sensors, can be used in many different applications, such as protective textile and wound dressing applications.

20 Claims, 7 Drawing Sheets

(56) References Cited

OTHER PUBLICATIONS

International Search Report and Written Opinion for PCT International Patent Application No. PCT/EP2017/051026, dated May 11, 2017.
Pankaj et al., "Applications of cold plasma technology in food packaging", Trends in Food Science and Technology, 2014, 35(1): 5-17.
Van Der Schueren et al., "Coloration and application of pH-sensitive dyes on textile materials", Coloration Technology, Apr. 2012, 128(2): 82-90.
Zille et al., "Plasma Treatment in Textile Industry", Plasma Processes and Polymers, 2015, 12(2):98-131.

* cited by examiner

Formula I

Formula II

METHODS FOR OBTAINING COLORED OR CHROMIC SUBSTRATES

RELATED APPLICATIONS

This application is a division of U.S. patent application Ser. No. 16/070,721, filed Jul. 17, 2018, which is a 35 U.S.C. § 371 filing of International Patent Application No. PCT/EP2017/051026, filed Jan. 19, 2017, which claims the benefit of priority to European Patent Application No. 16151848.5, filed Jan. 19, 2016, the contents of which applications are incorporated herein by reference in their entirety.

FIELD OF THE INVENTION

The present invention relates to the field of the dyeing/coloring of materials, particularly to methods for obtaining a colored substrate or a substrate with chromic properties using a gas plasma treatment.

BACKGROUND OF THE INVENTION

The process of coloring objects and materials has been around for many decades and is used for a wide variety of applications with the simplest examples including the dying of fabric in order to apply different colors. Recently, colored materials are gaining interest for their applicability in the field of optical sensors with these 'smart' sensory materials responding to a small environmental change with a clear and immediate color change. Colorimetric sensors are most commonly fabricated by attaching analyte-sensitive dye molecules to a carrier or surface, resulting in a change in optical properties under the influence of numerous stimuli including ions, gasses and a wide range of volatile organic compounds (VOC's). The straightforward use and unambiguous output signal of these sensors allow for their implementation in quick sample analysis but also continuous monitoring for a specific analyte. Most examples focus on the use of heath- or light-sensitive color change while pH-sensitivity or halochromism is less exploited.

In any coloring application, the main goal is to reduce the leaching of the added dye which could lead to a loss of color, contamination of other materials in close proximity and possible toxicological responses when used on the body or in a biomedical context.

The simplest method for obtaining a colored object or material is to stain the object or material after fabrication using an organic or aqueous solution of the desired dye. Although this method is straightforward and generally applicable for various materials, the main problem is that the dye is only absorbed by the material. This results in significant leaching of the dye when the colored material is contacted with a liquid, particularly in case of inert materials like PET and PTFE.

A second method commonly used in the dying of objects or materials is so-called dye doping which involves the addition of a suitable dye before or during the fabrication process, in particular the addition of the coloring agent into the feed mixture prior to polymer processing. This pre-fabrication modification can be used during various fabrication processes like hot-melt extrusion or electrospinning. Although the dye is not just on the surface but also in the bulk of the material, resulting in a homogenously colored material, it is still loosely held in place by physical interactions with the polymer. This means that significant dye leaching is still an issue, particularly in case the substrate is in contact with a solvent which can swell the substrate material. Also, the material type generally defines the kind of dyes which can be used.

The previous methods can be improved by adding fixating agents that help immobilize the dye. These agents are usually charged polymeric species that immobilize the dye using electrostatic interactions. These additives reduce the dye leaching significantly but not completely, and their use is typically restricted to charged dyes.

The only sure way to fully suppress dye-leaching from colored materials is to immobilize the dye on the material through covalent linkage which can again be performed both pre- and post-fabrication. For instance, the dye can be immobilized by a covalent bond through copolymerization prior to the material fabrication using electrospinning: the immobilization is performed through the functionalization of a precursor polymer with the desired dye after which the polymerized dye is introduced into the feed-mixture of the fabrication process. This approach has the potential of completely removing the dye leaching through careful design of the dye-monomer and resulting (co)polymeric material carrying dye moieties. Unfortunately, this method requires the sometimes complex synthesis of the polymeric dye which can be time consuming and expensive. Also, the material specific fabrication conditions require optimization for each polymer blend, making this an expensive process in both development and production, restricting it to high end applications like biomedically compatible sensory materials.

Another common strategy to achieve this covalent linkage is through the use of specific surface functionalities including amines and alcohols allowing the immobilization through respectively amide or ester formation. This approach is however restricted to reactive surfaces like silica or require the incorporation of precursor compounds during fabrication to introduce specific functionalities. Residual unreacted groups can also cause compatibility issues during application, making it not a generally applicable approach especially for common, inert plastics like PE, PP or PTFE.

WO2015088920 discloses a method for treating a substrate, comprising providing a substrate having a generally sheet or planar form or a fiber or yarn form; providing a colorant at the surface of the substrate and subjecting the substrate and colorant to reactive species from a plasma generated by an atmospheric plasma apparatus until the colorant is set at the surface of the substrate. However, in this process, the successful application of a colorant or dye to a fiber/substrate is dependent on the affinity of a given colorant to a given substrate. In addition, the high energetic nature of the generated plasma has a high risk of destroying or modifying the dye molecular structure, in particular its chromophoric moiety, and accordingly the dye's optical properties, particularly at longer plasma treatment time (as also shown and discussed in Example 2 herein), thus requiring larger dye loadings and limiting the applicability of the process.

There thus remains a need in the art for improved and more economic methods for obtaining colored substrates, which are applicable to a wide variety of substrate materials and a wide variety of coloring agents and whereby the colored substrate is no longer subject to dye leaching.

SUMMARY OF THE INVENTION

The present invention provides a post-fabrication modification approach for the fabrication of colored or chromic substrates using plasma surface modification (PSM).

In particular, the inventors have developed coloring or staining methods to covalently link a coloring agent to a substrate via a gas plasma treatment, in particularly covalently linking the coloring agent to the substrate's surface. In particular, in said methods, said coloring agent is a modified or functionalized coloring agent, i.e. a dye or pigment linked to a radical sensitive or polymerizable functional group as further defined herein and is applied to the substrate prior to the gas plasma treatment. Advantageously, the methods envisaged herein are generic in nature, which allow the covalent immobilization of various coloring agents or dyes on different materials without the need for optimizing each separate dye-material combination. As it is a post-fabrication process, the process as envisaged herein does not interfere with the substrate fabrication method or its properties. Moreover, only a low amount of dye is needed as only the surface is modified. Other benefits include the short treatment time and the possibility of operating the process in a continuous manner.

Advantageously, the inventors surprisingly found that the presence of or incorporating a radical sensitive functional or polymerizable group (as further defined herein) in the molecular structure of the dye or coloring agent contributes to keeping the structure of the dye intact during the plasma treatment and promotes the covalent linking of the dye to the substrate's surface. Indeed, as dyes have highly delocalized structures responsible for its unique electronic spectrum, the highly energetic plasma risks affecting or destroying the dye structure, resulting in the unwanted loss of the color properties. Without being bound by theory, the radical sensitive functional group of the functionalized coloring agent, in particular the polymerizable functional group or thiol group, which is linked to the chromophoric moiety of the coloring agent, preferentially reacts with the radicals formed on the substrate's surface during plasma treatment, causing the covalent immobilization of the dye to the surface.

Accordingly, a first aspect provides a method of preparing a colored object or substrate comprising the steps of (a) providing an object or substrate; (b) providing or fabricating a functionalized coloring agent, wherein said functionalized coloring agent comprises coloring agent linked or coupled to a radical sensitive group, i.e. an organic moiety comprising a polymerisable functional group or a thiol group; (c) applying said functionalized coloring agent on said object or substrate, particularly on the surface of said object or substrate; and (d) subjecting said object or substrate with said functionalized coloring agent applied thereon to a gas plasma treatment, particularly a non-thermal gas plasma treatment, to form covalent bonds between said functionalized coloring agent and said object or substrate, particularly between said functionalized coloring agent and the surface of said object or substrate. Optionally, said object or substrate is subjected to a gas plasma pre-treatment step before performing step (c);

In particular embodiments, said polymerizable group is a substituted or unsubstituted alkenyl or alkynyl moiety or a thiol group. Preferably, said radical sensitive or polymerisable group is a vinyl, vinyl ether, allyl, acryloyl, methacryloyl, acrylamidoyl, methacrylamidoyl, maleimidyl, propargyl or styrenoyl moiety.

In particular embodiments, the method as envisaged herein further comprises the step of performing a washing or extraction step after said gas plasma treatment of step (d).

In particular embodiments of the methods envisaged herein, the step (c) of applying said functionalized agent on said object or substrate is performed by submerging said object or substrate in an aqueous or organic solution comprising said coloring agent, by spray coating, by pad processing or by ink jet printing.

In particular embodiments, said gas plasma treatment of step (d) or said optional gas plasma pre-treatment step of step (a) is an atmospheric gas plasma treatment or a low-pressure gas plasma treatment. In particular embodiments, said gas plasma in said gas plasma treatment of step (d) or said optional gas plasma pre-treatment step of step (a) is a gas plasma of an inert gas, preferably helium or argon.

In particular embodiments, said object or substrate is an object or substrate made up of a polymeric organic material, such as a plastic object or substrate.

In particular embodiments, said coloring agent is a halochromic dye, a solvatochromic dye, a thermochromic dye or a photochromic dye.

Another aspect relates to a colored object or substrate, obtainable by a method as envisaged herein, wherein said object or substrate, particularly the surface of said object or substrate, is covalently linked to a functionalized coloring agent via said radical sensitive group as further defined herein.

Preferably, said colored object or substrate is incorporated in or forms part of a halochromic, solvatochromic, thermochromic or photochromic sensor.

Another aspect relates to the use of the colored substrate or chromic sensors as envisaged herein.

Certain embodiments relate to the use of a halochromic sensor obtainable by the methods envisaged herein for monitoring the shelf life of food products, preferably meat and fish products.

Certain embodiments provide a method for the fabrication of a halochromic wound dressing comprising covalently linking a functionalized halochromic dye to a carrier according to a method as envisaged herein, wherein said halochromic dye has a pKa value between 6 and 8, preferably about 7, thus obtaining a halochromic carrier, and incorporating said halochromic carrier in a wound dressing, wherein said functionalized halochromic dye is a dye linked to a radical sensitive functional group as further defined herein.

Certain embodiments relate to a method for the fabrication of a safety product for the detection of acidic or alkaline vapors comprising covalently linking a functionalized halochromic dye to an object or substrate according to a method as envisaged herein, thus obtaining a halochromic object or substrate, and manufacturing a safety product from said halochromic substrate, wherein said functionalized halochromic dye is a dye linked to a radical sensitive functional group as further defined herein Preferably, said safety product is a textile product, wherein said halochromic object or substrate is a halochromic fiber, fabric or textile.

The above and other characteristics, features and advantages of the concepts described herein will become apparent from the following detailed description, which illustrates, by way of example, the principles of the invention.

BRIEF DESCRIPTION OF THE DRAWINGS

The following description of the figures of specific embodiments of the methods and instruments described herein is merely exemplary in nature and is not intended to limit the present teachings, their application or uses. Throughout the drawings, corresponding reference numerals indicate like or corresponding parts and features.

DETAILED DESCRIPTION OF THE INVENTION

Figure 1:
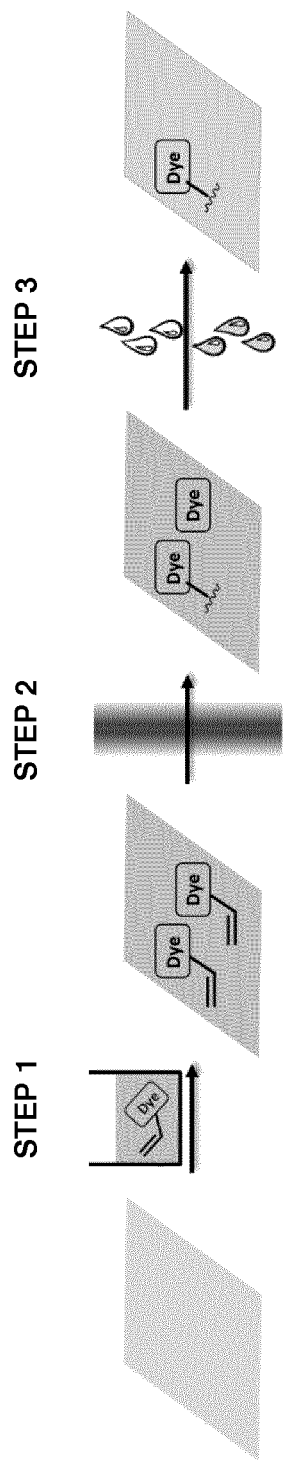
FIG. 1 is a schematic representation of the plasma dye coating procedure according to a particular embodiment of the present invention, wherein (i) step 1 corresponds to the dyeing step, wherein a functionalized dye is applied to the substrate, such as e.g. by dipping the substrate in a solution comprising a dye; (ii) step 2 corresponds to the plasma mediated surface modification, i.e. wherein the surface is treated with an inert gas plasma, thus generating surface radicals, resulting in the coupling of the functionalized dye to the object's surface; and (iii) step 3 corresponds to a washing or extraction (e.g. Soxhlet extraction) step for the removal of the unreacted dye molecules.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited components, elements or method steps also include embodiments which "consist of" said recited components, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments described herein are capable of operation in other sequences than described or illustrated herein.

The values as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to ensure one or more of the technical effects envisaged herein. It is to be understood that each value as used herein is itself also specifically, and preferably, disclosed. Typically, the term "about" should be read in this context.

The recitation of numerical ranges by endpoints includes all numbers and fractions subsumed within the respective ranges, as well as the recited endpoints.

Unless otherwise defined, all terms used in disclosing the concepts described herein, including technical and scientific terms, have the meaning as commonly understood by one of ordinary skill in the art. By means of further guidance, definitions for the terms used in the description are included to better appreciate the teaching of the present disclosure. The terms or definitions used herein are provided solely to aid in the understanding of the teachings provided herein.

The term "coloring agent" refers to any compound, particularly organic compound, comprising a chromophoric or color imparting moiety which can provide color to a material or substrate, such as a dye or a pigment. Dyes typically occur as a liquid solution at some point during their application, while pigments are generally insoluble, resulting in a suspension. Dyes are typically aromatic organic compounds or compounds comprising a conjugated double bond system in their chromophore structure and are classified based on the nature/structure of their chromophore or based on their solubility and chemical properties. A preferred coloring agent is a dye. In particularly preferred embodiments, the term "coloring agent" refers to a dye functionalized or modified with a polymerizable or radical sensitive functional group, as further defined herein.

As used herein, the term "substrate" is used interchangeably with the terms "object" or "material", and refers to the physical entity to be colored, i.e. the physical entity whose surface is to be treated with a coloring agent via a method as envisaged herein.

The term "chromic", as in chromic materials/substrates/objects, as used herein specifically refers to materials, substrates or objects which exhibit color changing phenomena, involving a change in color when the chromic material/substrate is subjected to a chemical or physical external influence, such as photochromic substances (color change caused by light), thermochromic substances (color change caused by temperature or heat), halochromic substances (color change caused by changes in pH) or solvatochromic substances (color change caused by changes in solvent polarity).

Reference throughout this specification to "one embodiment" or "an embodiment" means that a particular feature, structure or characteristic described in connection with the embodiment is included in at least one embodiment envisaged herein. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are also envisaged herein, and form different embodiments, as would be understood by those in the art. For example, in the appended claims, any of the features of the claimed embodiments can be used in any combination.

The inventors have developed methods to obtain colored materials or substrates, in particular surface-colored materials or substrates, which are no longer subject to dye leaching, without the need of interfering with the fabrication method of the material or substrate, based on the covalent linking of an absorbed suitable coloring agent to the surface of a material through plasma surface modification, in particular through free radical reactions between the surface of the material which comprises radical species due to the treatment with a gas plasma of an inert gas, and the functionalized coloring agent, which has been modified to include a functional group which is particularly susceptible to radical species. In particular embodiments, the inventors have developed methods to obtain chromic materials, or stated differently, methods to apply to a material or substrate a coloring agent, preferably a dye, which is able to change color when subject to certain chemical or physical conditions (e.g. change in pH, solvent, etc). The methods as envisaged herein provide economically viable coloring processes, which are applicable to a wide variety of polymeric materials and dyes, and are particularly suited for the fabrication of chromic sensors for various applications.

Accordingly, a first aspect of the present invention generally provides methods for the coloration of an object or substrate, or methods for obtaining a colored or chromic object or substrate using a gas plasma surface modification step. Thus, disclosed herein is a method for the fabrication of a colored object or substrate comprising the steps of (a) providing an object or substrate; (b) providing or fabricating a suitable coloring agent, in particular a functionalized coloring agent comprising a coloring agent modified with and linked to a radical sensitive functional group, as envisaged herein; (c) applying said coloring agent, particularly said functionalized coloring agent, onto said object or substrate, particularly on a surface of said object or substrate, thus obtaining a (surface) coated object or substrate, and (d) subjecting the coated object or substrate (i.e. the surface whereon the coloring agent has been applied) to a gas plasma treatment (also referred herein as a "first gas plasma treatment") until the coloring agent is covalently linked or set at the surface of the substrate, particularly via the radical sensitive functional group as further defined herein.

By subjecting the surface of the substrate to a gas plasma, particularly a non-thermal gas plasma, such as a non-thermal gas plasma of an inert gas, radicals are formed which subsequently result in the formation of covalent bonds between the functionalized coloring agent, particularly between the radical sensitive functional group, particularly between the polymerizable group or thiol group, of the functionalized coloring agent and the substrate. This way, the coloring or staining methods as envisaged herein thus address the issue of dye leaching by avoiding such dye leaching by the covalent bond between surface and coloring agent. In addition, the gas plasma treatment is a solvent-free and direct method to covalently link the coloring agent to the substrate surface, without impacting the bulk properties of the substrate.

It is understood the process can be repeated multiple times to increase the coloring agent loading at the surface in order to impart the desired color properties, such as intensity and the like.

Importantly, said suitable coloring agent is a functionalized coloring agent, i.e. a (unmodified) coloring agent modified with a radical sensitive group, in particular a (unmodified) coloring agent modified with a polymerisable functional group or an organic moiety comprising a thiol group, prior to applying said functionalized coloring agent onto said substrate. It is understood that, typically, the unmodified coloring agent does not comprise a radical sensitive group or polymerizable functional group as envisaged herein. Thus, as used herein, the term "functionalized coloring agent" refers to a coloring agent, such as a dye, comprising or linked to a radical sensitive functional group. As used herein, the term "radical sensitive (functional) group" refers to an organic moiety group, particularly a non-radical organic moiety, which comprises a reactive site or a reactive functional group sensitive to free radicals, such as a thiol group or a non-radical functional group which can be subject to (free) radical addition reactions. Preferably, said radical sensitive (functional) group is an organic moiety comprising a polymerizable (functional) group or an organic moiety comprising a thiol group. As used herein, the term "polymerizable functional group" as envisaged herein typically refers to organic moieties which are commonly used in various monomers for radical polymerization, typically comprising a pi-bond (π-bond), particularly a pi-bond between two carbon atoms. In particular embodiments, said polymerizable functional group or radical sensitive functional group is a substituted or unsubstituted alkenyl or alkynyl moiety or a thiol group. In particular embodiments, said polymerizable functional group or radical sensitive functional group is a substituted or unsubstituted vinyl, vinyl ether, allyl, acryloyl, methacryloyl, acrylamidoyl, methacrylamidoyl, maleimidyl, propargyl or styrenoyl moiety. In particularly preferred embodiments said polymerizable or radical sensitive functional group is a substituted or unsubstituted alkenyl or alkynyl moiety wherein the double bond is stabilized by being part of a conjugated double bond system, such as an acryloyl, methacryloyl, acrylamidoyl, methacrylamidoyl or styrenoyl moiety. In certain embodiments, the polymerizable functional group or radical sensitive functional group does not form a conjugated system with the chromophoric structure of the coloring agent, particularly the dye. Advantageously, when using a functionalized coloring agent as envisaged herein, the covalent linking of the dye to the surface of the substrate by the plasma treatment is promoted with little if any dye degradation. In addition, as the polymerizable or radical sensitive functional groups of the functionalized coloring agent or dye preferentially react with the formed surface radicals during plasma treatment, the chromophore moieties of the coloring agent or dye are not affected during plasma treatment. In contrast, when a non-functionalized dye is subject to a plasma treatment in a coloring or staining method, the setting and immobilization of the coloring agent is generally less efficient, as significant degradation of the dye structure, i.e. of the chromophore moiety, may occur.

It is understood the methods envisaged herein are applicable to a wide variety of coloring agents known in the art, such as pigments or dyes. Preferably, said coloring agent is a dye, including but not limited to synthetic and organic dyes. Accordingly, said coloring agent may be an acid dye, a basic dye, a direct dye, a mordant dye, a vat dye, a disperse dye, an azoic dye or a sulfur dye. Suitable dyes include but are not limited to azo dyes, anthraquinone dyes, benzodifuranone dyes, polycyclic aromatic carbonyl dyes, indigoid dyes, polymethine and related dyes, phthalocyanine dyes, nitro and nitroso dyes.

In particular embodiments, said coloring agent is a chromic dye, more particularly is a halochromic dye, a thermochromic dye, a solvatochromic dye, a photochromic dye or an electrochromic dye, wherein said dye is modified or functionalized by a radical sensitive or polymerizable functional group as defined herein, covalently linked to the dye. Advantageously, the presence or incorporation of a radical sensitive or polymerizable functional group as envisaged herein in the functionalized dye allows to color a given substrate or material with certain dyes, which are known to be not or less suitable to color said given substrate or material.

In certain embodiments, said coloring agent is a halochromic or pH-responsive dye. Suitable pH-responsive dyes are known in the art. In certain embodiments, the functionalization of the dye as envisaged may influence the electronic structure and pKa of the dye. In this case, the pKa value of the functionalized dye can be determined through pH-titration of the dye while measuring UV-VIS absorbance spectra at regular intervals. Alternatively, the pKa values of the modified dyes can be estimated/determined through molecular modelling, as described in De Meyer and Hemelsoet (Dye, 2014:34), which is hereby incorporated by reference.

Advantageously, such a modelling approach makes it possible to predict the pKa value for a certain modification of a pH-responsive dye prior to synthesis of the functionalized dye, thus allowing better design of pH-responsive materials for applications requiring a specific pH sensing range.

In certain embodiments, said dye, preferably said pH-responsive dye, is an azo dye, comprising an —N=N— bond in the conjugated double bond system of the chromophoric moiety, wherein said azo dye is functionalized as envisaged herein. Preferably, said dye comprises an azobenzene structure, which is functionalized as envisaged herein. In particular embodiments, said dye comprises an aminoazobenzene structure according to formula I in FIG. 2, wherein the substituents R1-R7 control the dye color and dyeing properties. Exemplary aminoazobenzene dyes include but are not limited to Solvent Yellow 3 (R1=R2=R5=R6=R7=H; R3=R5=Methyl); Disperse Red 1 (R2=R3=R4=R5=H, R1=NO2, R6=ethyl, R7=C2H4OH); Disperse Red 13 (R2=Cl, R3=R4=R5=H, R1=NO2, R6=ethyl, R7=C2H4OH); Disperse Orange 30 (R2=R3=Cl, R4=R5=H, R1=NO2, R6=C2H4CN, R7=C2H4OAc); Disperse Violet 12 (R3=R4=R5=H, R1=R2=NO2, R6=C4H9, R7=C2H4OH).

Figure 2:
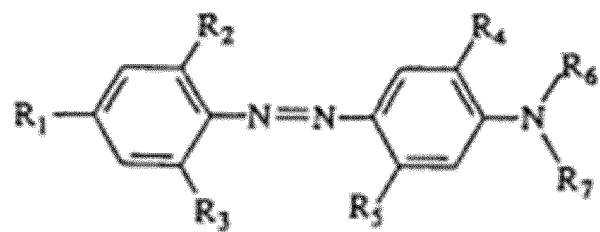
FIG. 2 represents generic structural formulas of dyes suitable in particular embodiments of the present invention. Formula I: aminoazobenzene dye; formula II: sulfonphthalein dye.
Figure 2:
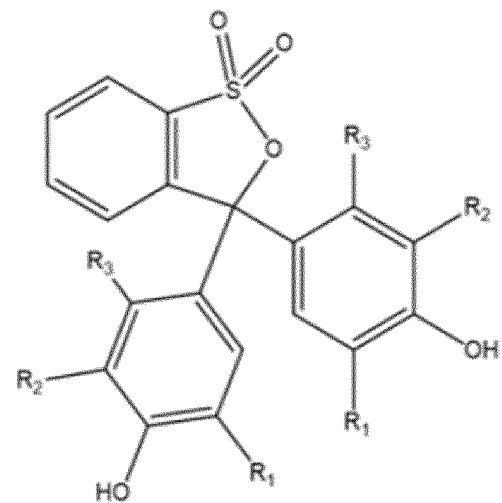

In certain embodiments, said dye, preferably said pH-responsive dye comprises a sulfonphthalein structure according to formula II in FIG. 2, wherein the substituents R1-R3 determine the dye color and pKa properties. Exemplary sulfonphthalein dyes include Chlorophenol Red (R1=Cl, R2=R3=H), Bromophenol Blue (R1=R2=Br, R3=H), Bromocresol Purple (R1=BR, R2=methyl, R3=H), Bromocresol Green (R1=R2=BR, R3=methyl) or Bromothymol Blue (R1=isopropyl, R2=Br, R3=methyl).

Methods for functionalizing a coloring agent to obtain a functionalized coloring agent linked to a radical sensitive or polymerizable functional group are well-known in the art. Depending on the structural characteristics of the coloring agent, it is within the ordinary skill of the skilled person to select a suitable functionalization method. In certain embodiments, a coloring agent comprising a nucleophilic moiety such as an alcohol, amine or carboxylic acid, may be linked to a suitable radical sensitive functional group as envisaged herein via an ester or ether bond. Preferably, said nucleophilic moiety is not part of the chromophoric group, i.e. is isolated from the aromatic or conjugated double bond system of the chromophoric group, to minimize the influence of the functionalization on the properties of the dye.

More complex dyes may require other derivatization procedures known in the art. For instance, dyes comprising arylhalogenide structures, e.g. sulfonphthaleine dyes comprising arylbromides or arylchlorides, can be functionalized with a suitable functional group (e.g. styrene moieties) via a Suzuki-Miyaura coupling using an organic boronic acid in the presence of a Pd catalyst. They may also be functionalized with vinyl moieties via a Stille coupling, using Pd-catalyzed coupling reactions.

It is understood the methods envisaged herein are applicable to a wide variety of substrate materials, particularly polymeric or biopolymeric organic materials and plastics, including thermoplastic or thermoset polymeric materials. Exemplary substrates include but are not limited to substrates made up of polyester, such as PET; polyamide such as nylon-6 or nylon-6,6; polyolefins such as polypropylene, polyethylene (including HDPE, LDPE) and the like, PTFE; cellulose, etc.

In certain embodiments said substrate or object is a non-woven material. In certain embodiments said substrate or object has a thread or wire form, or a sheet or planar form. In certain embodiments said substrate or object is a 3D article made up of an organic polymeric material, which may be obtained by 3D printing, molding or any other fabrication method known to the skilled person.

In certain embodiments said substrate is a textile, fabric, woven material or fibrous substrate, made up of synthetic fibers, natural fibers or blends thereof.

In step (c) of the methods as envisaged herein, the functionalized coloring agent may be applied to the substrate, particularly the surface thereof, by any suitable method known in the art. In particular embodiments, the functionalized coloring agent is applied by contacting the substrate with an aqueous or organic solution of said functionalized coloring agent, such as by spray coating, submerging the substrate into said coloring agent solution, pad processing, inkjet printing and the like, thus allowing the coloring agent to absorb onto the substrate surface. In certain embodiments, the functionalized coloring agent concentration in said solution is at least 10, 25 or 50 mg/ml.

In certain embodiments, said solution comprising said functionalized coloring agent further comprises a multifunctional crosslinking agent to promote the coupling of the coloring agent with the substrate surface. A suitable crosslinking agent comprises multiple functional groups, particularly radical sensitive functional groups, allowing to react with multiple dye and substrate molecules. Exemplary crosslinking agents include pentaerythritol tetra(meth)acrylate, trimethylolpropane trimethacrylate, Bisphenol A ethoxylate diacrylate, Ethylene glycol dimethacrylate (EGDM), Dipentaerythritol penta-hexa-acrylate, or glycerol 1,3-dimethacrylate (GDMA), which are particularly suitable in combination with (meth)acryloyl modified coloring agents. In addition, the crosslinking agent may prevent dye degradation by acting as a radical scavenger.

In preferred embodiments, the method further comprises a drying step after applying the solution comprising the functionalized coloring agent to the substrate but before said first gas plasma treatment. Said drying step functions to remove the aqueous or organic solvent, which might interfere with the covalent linking of the functionalized coloring agent with the substrate during the gas plasma treatment.

Optionally, the methods as envisaged herein may further comprise a pre-treatment of the substrate (also referred herein as a "second gas plasma treatment" or a "gas plasma pre-treatment") by subjecting the substrate to a gas plasma pre-treatment, particularly a non-thermal gas plasma pre-treatment, before applying the functionalized coloring agent to said substrate, to modify the surface reactivity or its hydrophilic/hydrophobic properties. Advantageously, this improves the wettability and uniform application of the functionalized coloring agent solution on the substrate, particularly when using aqueous solutions, and promotes the homogenous absorption of the functionalized coloring agent on the substrate surface prior to the (first) gas plasma treatment of step (d). In certain embodiments said gas plasma pre-treatment is with $O_2$ or is with an inert gas.

In particular embodiments, the surface of the substrate is partially treated with the functionalized coloring agent or the coloring agent is applied in a pattern. In other embodiments, the substrate is completely coated with the functionalized coloring agent.

The methods as envisaged herein include the treatment of the surface of the substrate with plasma (also referred to as plasma surface modification or PSM) following applying the functionalized coloring agent to the surface of the substrate. Plasma is generally classified as thermal or non-thermal. A thermal plasma typically has a temperature of several thousand degrees, which is destructive of the substrates and/or the coloring agents as envisaged herein. Non-thermal plasmas are also known as so-called "cold" plasmas because they are typically maintained at low temperatures such as between 0-100° C. In the context of the present invention the gas plasma is a non-thermal plasma, preferably generated by electrical energy, by applying a voltage across the gas. It is well known that gas plasma can transform substrate surfaces in various ways, such as etching or cleaning the substrate surface, breaking of chemical bonds or grafting of chemical moieties or functional groups.

In certain embodiments, said first non-thermal gas plasma treatment or said optional gas plasma pre-treatment is a sub-atmospheric or low-pressure gas plasma treatment, operating at pressures of about 1-100 Pa. Low-pressure gas plasma treatments are typically performed in a closed vessel linked to a vacuum pump.

In other embodiments, the first non-thermal gas plasma treatment of step (d) or said optional gas plasma pre-treatment of step (a) is an atmospheric gas plasma treatment, such as a corona treatment, dielectric barrier discharge or atmospheric glow discharge. Advantageously, an atmospheric gas plasma treatment easily allows for continuous processing.

Although many parameters influence the plasma treatment, it is within the ordinary skill of the skilled person to apply suitable plasma treatment conditions which favor the immobilization of the (functionalized) coloring agent to the surface. Typically, short plasma treatment times are envisaged, ranging between 20 or 30 seconds and 10 min, preferably ranging between 30 seconds and 2, 3, 4 or 5 min, more preferably is about 1 min.

In particular embodiments, said first gas plasma treatment is performed with an inert gas, such as a noble gas, preferably argon or helium. Advantageously, this allows the generated radical species, generated on the surface of the substrate, to form covalent bonds between the substrate surface and the functionalized coloring agent, without chemically altering the surface or the coloring agent, while limiting other plasma induced reactions, such as polymer degradation or incorporation of oxygen or nitrogen containing functional groups.

In particular embodiments, the methods as envisaged herein may further comprise the step of contacting the substrate after said first plasma treatment of step (d) with the functionalized coloring agent, in oxygen free conditions, such as an oxygen free atmosphere and/or a deoxygenated solution of the coloring agent, preferably at elevated temperatures. This way, the loading of the functionalized coloring agent on the surface may be increased by allowing the residual surface radicals to react with additional coloring agent molecules.

In particular embodiments, the methods as envisaged herein further comprise the step of subjecting the covalently coated substrate after the gas plasma treatment to a washing step. This allows the removal of undesired gas plasma reaction products and unreacted dye molecules. In certain embodiments, the washing step comprises a soxhlet-type extraction step.

In another aspect of the present invention, the chromic materials obtained via the coating methods envisaged herein are particularly useful as chromic sensors in numerous applications wherein a color change, visible to the naked eye, corresponds to a change in environmental conditions, e.g. a change in solvent polarity, pH, temperature, the presence or concentration of a specific analyte, and the like. The unambiguous output signal of these sensors, i.e. the change in color allows for the continuous and reliable monitoring and fast visualization of the (changing) environmental conditions. Advantageously, the chromic sensors envisaged herein are not subject to leaching of the dye from the material, which would result into loss of sensitivity or output signal of the chromic sensor and possible toxicological responses depending on the application. Exemplary applications of the chromic sensors envisaged herein include halochromic textile products in e.g. protective clothing; halochromic wound dressings and sensors for monitoring the shelf life of food products.

Accordingly, another aspect of the present invention relates to the use of the colored substrates or materials obtained by the methods envisaged herein as chromic sensors. Stated differently, methods for the fabrication of chromic sensors comprising the steps of (i) providing a suitable carrier, preferably an inert carrier, and a suitable chromic coloring agent functionalized with a radical sensitive functional group as envisaged herein; (ii) applying said functionalized chromic coloring agent on said carrier, thus obtaining a coated carrier, and (iii) subjecting the coated carrier to a first non-thermal gas plasma treatment, thus obtaining a chromic carrier wherein the coloring agent is covalently linked to the carrier via said radical sensitive functional group.

In certain embodiments, said carrier is a non-woven material. The flexible properties and large surface to volume ratio of non-woven material are advantageous in many sensor applications.

In particular embodiments, said chromic sensor is a halochromic sensor, a thermochromic sensor, a solvatochromic sensor, a photochromic sensor or an electrochromic sensor.

In particular embodiments, said chromic sensor is a halochromic sensor, incorporated in a safety device or safety article, for the detection of acid (e.g. HCl) or alkaline ($NH_3$) vapors, such as incorporated in a fabric or textile, preferably incorporated in protective clothing. Thus, certain embodiments provide a method for the fabrication of a safety product for the detection of acidic or alkaline vapors comprising covalently linking a functionalized halochromic dye to a substrate according to a method as envisaged herein, thus obtaining a halochromic substrate, and manufacturing a safety product comprising said halochromic substrate. In particular embodiments, said safety product is a textile product, comprising a fiber, fabric or textile covalently linked to a halochromic dye according to the methods as envisaged herein. For instance, a halochromic sensor covalently linked to Disperse Red 1 according to the methods envisaged is useful in such acid vapor sensing applications, such as textiles applications in protective clothing.

In other embodiments, said chromic sensor is a halochromic sensor for monitoring, preferably continuously monitoring, the shelf life and spoilage of food products, particularly meat and fish products. As the spoilage of protein rich products, in particular fish products, is usually accompanied by an increase of microorganisms that produce various volatile amines like trimethylamine and ammonia, a pH sensitive chromic sensor in contact with the headspace of the food product package, such as e.g. a halochromic sensor comprising Bromocresol Green obtained by the methods envisaged herein, allows to visually monitor the increase of the volatile amines in the headspace of the packaging can visually be monitored by a color change.

In yet other embodiments, said chromic sensor is a halochromic sensor incorporated in a wound dressing for monitoring the healing process and the detection of infections. As there is a strong correlation between the healing process and the pH of the wound, with an alkaline environment (pH >7.25) indicating bacterial colonization or infection of the wound, the incorporation of a pH-responsive dye with a suitable pKa into the wound dressing would, thus, allow visually distinguishing between a healthy healing wound and an infected wound. For instance, a halochromic sensor comprising a substrate covalently linked to a sulfonphthalein dye according to the methods envisaged is useful in such infection detecting wound dressing applications. Thus, certain embodiments provide a method for the fabrication of a halochromic wound dressing comprising covalently coating a carrier, such as a non-woven carrier, with a halochromic dye according to the methods envisaged herein, wherein said halochromic dye has a pKa value between 6 and 8, such as between 6.5 and 7.5, such as about 7, and incorporating said halochromic carrier in a wound dressing.

Particular embodiments are further exemplified in the examples below.

EXAMPLES

The following examples are provided for the purpose of illustrating particular embodiments of the claimed methods and applications and by no means are meant and in no way should be interpreted to limit the scope of the present invention.

In the following examples the following chemicals and instruments were used:

The polyamide-6 was fabricated in-house using electrospinning from acid solution according to a previously published protocol, cellulose-based filter paper was from VWR; the PTFE was from Dubruel. Samples of high-density polyethylene was cut out of a 2.5l solvent container, low-density polyethylene was cut out of small sealant bag and polypropylene was cut out of a plastic cup.

Ethanol (absolute) and tetrahydrofuran (>99.9%) used for the dipping solution and soxhlet extraction were bought from Fischer Scientific and Sigma-Aldrich respectively and used as received. The used dyes or starting compounds were used as received with Disperse Red 1 (95%), Bromothymol Blue (95%) and Bromocresol Purple (90%) bought from Sigma-Aldrich, both Rose Bengal (acid red 94, 95%) and 4-bromo-1,8-naphthalic anhydride (95%) were bought from TCI Europe.

The instrument used for the creation of the plasma was a cylindrical dieletrical plasma discharge generator (Femot Model, Version 3, Diener Electronic, Germany). Argon was used as discharge gas at a pressure of 0.8 mBar and was activated by a rf-generator (100 W). The dye loading during procedural optimization was determined by UV-VIS absorption spectroscopy of the PA6 sample after soxhlet extraction dissolved in FA/AA 1/1. For this, a calibration curve was determined using DR1 in the same acid mixture. Because the alcohol used for modification in DR1 is isolated from the aromatic system, the effects of the modification and immobilization on the absorption spectrum are expected to be minimal.

The contact angles were performed on a SCA 20 Instrument (Dataphysics), equipped with a light source and high speed video system with CCD cameras. To determine the static contact angles of the polymer surfaces, the sessile drop method was used. The static contact angle was determined 5 seconds after the first contact of the water droplet with the surface, using the circle fitting of the imaging software SCA20 (version 2.1.5).

Example 1: Dye Functionalization (A) In a first set of experiments, the azobenzene Disperse Red 1 (DR1) was modified via two different pathways. Due to the presence of an isolated aliphatic primary alcohol group, DR1 can be easily modified without affecting the aromatic ring and, hence, the dye properties.

Figure 3:
FIG. 3 represents reaction conditions for the synthesis of Disperse Red 1 methacrylate (DR1-MA) from Disperse Red 1 (DR1) reacted with methacryloyl chloride, according to certain embodiments.

[A1] In the first pathway both DR1-acrylate (DR1-A) and DR1-methacrylate (DR1-MA) were synthesized through the esterification of DR1 with an excess of (meth)acryloylchloride under dry (water-free) conditions (dichloromethane or THF), as schematically represented in FIG. 3. In order to control the exothermic reaction, the (meth)acryloylchloride is added dropwise to a solution of DR1 that is cooled in an ice bath. The reaction is forced to full conversion by the addition of $Et_3N$ in the DR1 solution prior to reaction, which increases the nucleophilicity of the alcohol through deprotonation and also traps the generated HCl as triethylamine salts. After complete addition of the acylchloride, the reaction is allowed to warm up to room temperature and is finished in about four hours as determined by sampling the reaction and analyzing using TLC (silica, DCM/EtOAc 5/1).

In this context, the reaction conditions can be summarized as follows: 5.09 g of Disperse Red 1 (0.016 mol, 1 eq) was dissolved in anhydrous $CH_2Cl_2$ (250 mL) and $Et_3N$ (7.7 mL, 0.055 mol, 3.4 eq) and cooled to 0° C. under inert atmosphere. 0.032 mol (met)acryloyl chloride (2 eq) was added dropwise to the mixture under vigorous stirring after which the mixture was allowed to warm up to room temperature.

The final reaction product is isolated using flash column chromatography on silica (DCM/EtOAc 5/1) yielding a red powder. This allowed the synthesis and purification of up to 10 grams of DR1-A or DR1-MA at a time, but a 100 gram scale reaction should also be possible with efficient cooling. The identity of the DR1-A or DR1-MA product was confirmed via $^1$H-NMR spectroscopy. Indeed, the appearance of the acrylate peaks in the $^1$H-NMR spectrum between 5.5 and 6.5 ppm, integrating for three protons, and the complete shift of the methylene adjacent to ester bond from 3.9 ppm to 4.45 ppm due to the added electron withdrawing effect are proof of the successful modification.

Using this methodology, similar azobenzene dyes were functionalized with an acrylic or methacrylic group including Disperse Red 13, Disperse Blue 106 and Solvent Yellow 3.

[A2] The second pathway is a one-pot, two-step etherification reaction where firstly the alkoxide form of DR1 is generated through deprotonation with NaH followed by the addition of a suitable alkenyl or alkynyl chloride or bromide in dry dimethylformamide (DMF). The deprotonation is highly exothermic and is performed with cooling in an ice bath. After 15 min of stirring the (liquid) electrophile is added dropwise after which the reaction is allowed to proceed overnight at room temperature under continuous stirring. The residual NaH is deactivated by the addition of a saturated $NH_4Cl$ solution at 0° C. followed by the extraction of the product using EtOAc allowing removal of the DMF, which remains in the aqueous phase. The crude product obtained after evaporation of the combined organic phases is further purified using column chromatography. With this procedure gram scale quantities of modified DR1 in good yields (60-75%) could be obtained. This second pathway expanded the group of polymerizable DR1 derivatives to Disperse Red 1-styrene (DR1-Sty), Disperse Red 1-allyl (DR1-allyl) and Disperse Red 1-propargyl (DR1-propargyl) through the reaction with chloromethylstyrene, allylbromide and propargylbromide, respectively.

For instance, the synthesis of DR1-Sty was performed as follows: 54 mg of NaH (60% suspended, 1.35 mmol, 1.76 eq) was suspended in anhydrous DMF (1 mL) and cooled to 0° C. 0.241 g of DR1 (0.77 mmol, 1 eq) was dissolved in 1.5 mL DMF and added slowly to the mixture while stirring vigorously at 0° C. for 15 min. subsequently, 0.17 mL of vinylbenzylchloride (1.09 mmol, 1.42 eq) was added dropwise after which the mixture was allowed to heat up to room temperature and stirred overnight. The reaction was monitored using TLC (Silica, DCM/n-Hex 8/2) which showed nearly complete consumption of DR1 after 12 h. Residual NaH was deactivated by slowly diluting the reaction mixture with 5 mL of sat. $NH_4Cl$ at 0° C. after which the compounds were extracted with EtOAc. The organic fractions were collected, washed with brine, dried with $Na_2SO4$ and dried under vacuum. The resulting dark red shiny solid was further purified using column chromatography (Silica, DCM/n-Hex 8/2) yielding DR1-Sty as a red powder.

The etherification approach results in radical sensitive dyes which are hydrolytically stable over the entire range of pH values in aqueous solutions. The successful synthesis of these DR1-derivatives was confirmed using $^1$H-NMR spectroscopy. Indeed, the characteristic styrene, allyl or propargyl peaks could be detected but also the little effect on the chemical shift of the ethylene spacer (3.5-4 ppm) due to the similar withdrawing effect of the created ether compared to the original alcohol group could be observed.

[B] Another one one-step dye modification is the synthesis of a Rose Bengal styrene derivative. In this synthesis method, the Rose Bengal sodium salt (1 eq) was modified by adding chloromethylstyrene (CMS) (2.16 eq) in DMF and heating the mixture to 80° C. for 12 h causing a nucleophilic attack of the deprotonated acid and substitution with the added chloride. After evaporation of the solvent under reduced pressure, the crude product was purified using column chromatography on silica (DCM/MeOH 95/5) to produce a shiny purple solid in 80% yield (after evaporation). In order to prevent any radical addition or polymerization of the styrene moieties at this high temperature, the reaction was performed under inert Ar atmosphere in the presence of phenothiazine as radical scavenger.

In conclusion, the three reactions described above in [A1], [A2] and [B] can be considered as easy, generally applicable, large scale dye modification reactions, particularly for dyes comprising a nucleophilic functional group i.e. alcohol, amine or carboxylic acid, which is preferably isolated from the aromatic system to ensure minimal influence of the modification on the properties of the dye and also to increase the selectivity of the reaction for multi-functional molecules.

Figure 4:
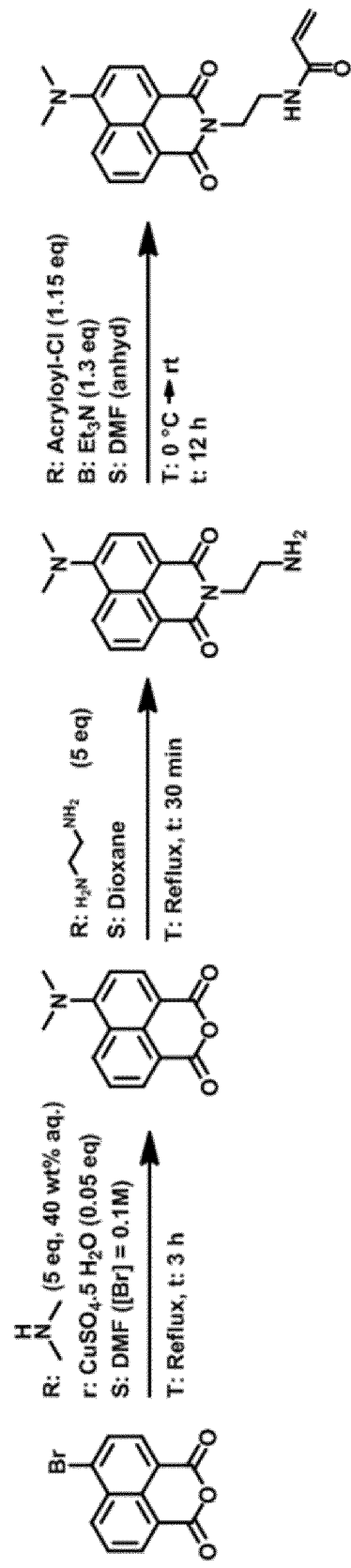
FIG. 4 represents the reaction scheme for the synthesis of 4-N,N'-dimethylamino-1,8-acrylamidoethylnaphthilimide (DMAAENI), according to certain embodiments.

[C] An acrylamide moiety was introduced in a solvatochromic fluorescent dye with a 1,8-naphthilimide core structure, resulting in 4-N,N'-Dimethylamino-1,8-acrylamidoethylnaphthilimide. The multistep procedure is schematically represented in FIG. 4. In a first step, 4-bromo-1,8-naphthalic anhydride (BNA) (1 eq) is dissolved in a mixture of dimethylamine (40 wt % aqueous solution; 5.2 eq) and DMF. The bromide is selectively exchanged with a dimethylamino group by boiling both in DMF under reflux in the presence of $CuSO_4.5H_2O$ (0.05 eq) for 4 hours. The resulting fluorescent product precipitated at room temperature and was isolated by filtration and dried in a vacuum oven.

In the second step, the cyclic anhydride was opened and closed by the added primary amine resulting in the formation of the cyclic imide by boiling in 1,4-dioxane. 1 eq of 4-N,N'-dimethylamino-1,8-naphthilic anhydride was dispersed in 1,4-dioxane and added dropwise to a refluxing mixture of ethylene diamine (5.24 eq). This reaction was done in large excess of ethylene diamine to prevent the formation of double reacted compound. The single reacted product was isolated via selective retention of the amine-functionalized product on a silica column, which was afterwards recovered by washing with 1% $Et_3N$. An alternative reaction involved the cyclic anhydride opening by a mono-boc-protected ethylenediamine to prevent the formation of side products entirely, and subsequent removal of the boc protection group.

Finally, in the third step, the acrylamide derivative was synthesized using the acryloylchloride reaction as discussed previously in [A1]. This was performed in dry DMF due to the precipitation of the fluorescent reagent in DCM and THF at low temperatures. 4-N,N'-dimethylamino-1,8-aminoethylnaphthilamide (1 eq.) was dissolved in a mixture of triethylamine (1.31 eq) with dry DMF and cooled to 0° C. Acryloylchloride (1.20 eq) was diluted in 5 mL of dry DMF and added slowly to the cooled mixture while stirring. After addition, the mixture was allowed to heat up to room temperature and stirred overnight. After evaporation, the final compound was isolated by column chromatography on silica (DCM/Acetone 8/2) to produce a bright yellow powder in an overall yield of approximately 25%. The identity of the intermediates and final product was elucidated using $^1$H-NMR spectroscopy the final product was further characterized using HR-MS proving the structure of the acrylamide-modified fluorescent dye.

Figure 5:
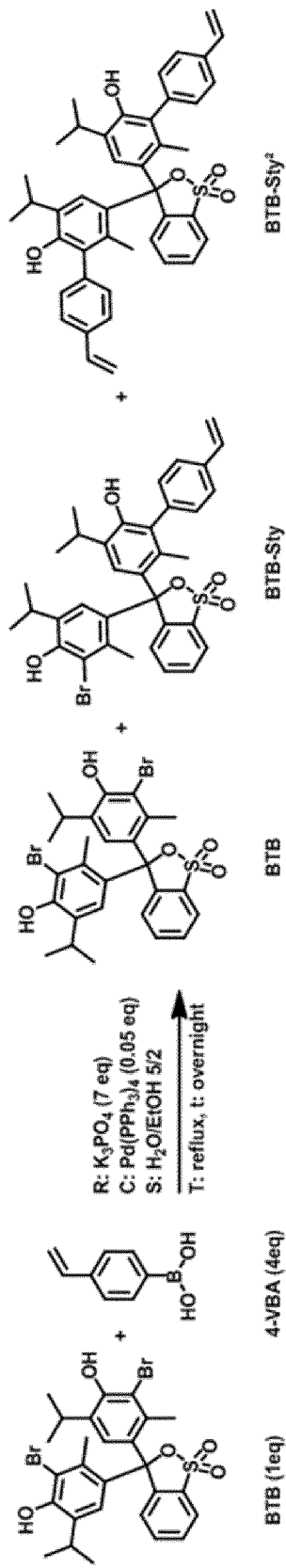
FIG. 5 represents the synthetic scheme of the Suzuki coupling of Bromothymol Blue with 4-vinylphenylboronic acid, according to certain embodiments.

[D] Sulfonphtalein dyes carrying aryl-halide substituents, such as Chlorophenol Red (CPhR), Bromophenol Blue (BPhB), Bromocresol Purple (BCP), Bromocresol Green (BCG) and Bromothymol Blue 5 (BTB), can be modified via the Suzuki-Miyaura coupling using a boronic acid in the presence of a Pd catalyst, in an oxygen free environment, as represented in FIG. 5. To this end, the reagents solution was deoxygenated using three consecutive freeze-pump-thaw cycles prior to catalyst addition or simple Ar bubbling for 30 minutes with the catalyst already added to the mixture.

Styrenoyl-BTB (BTB-Sty) was obtained by reacting BTB with 4-vinylphenylboronic acid (4-VBA) in the presence of a Pd catalyst in a water/ethanol (5/2) mixture, overnight under reflux. The resulting product was purified using reverse phase preparative HPLC. In a similar manner, BCP-Sty$^2$ was synthesized. For instance, 0.501 g of Bromothymol Blue (BTB, 0.813 mmol, 1 eq), 0.153 g of 4-vinylphenyl boronic acid (4-VBA, 1.035 mmol, 1.27 eq) and 0.612 g of K$_3$PO$_4$ (2.88 mmol, 3.5 eq) were dissolved in 8 mL of a 7/3 mixture of water/EtOH. This dark blue solution was degassed using three freeze-pump-thaw cycles to remove all traces of oxygen after which 46.27 mg of Pd(PPh$_3$)$_4$ (0.004 mmol, 0.05 eq) was added as a solid under a slight argon overpressure. The resulting suspension was stirred and heated to reflux (80° C.) overnight. The mixture was purified by filtering off the Pd(PPh$_3$)$_4$, acidifying with 1M HCl and extraction with EtOAc. Using higher temperature (140° C. in the μW), shorter reaction time (3 h) and large excesses of 4-VBA (3 eq) and K$_3$PO$_4$ (16.5 eq), the formation of the double reacted product was preferred, which could subsequently be isolated by normal phase column chromatography on silica using CHCl3/MeOH 5/1 with 1% FA.

Even though the substitution of the bromide with a styrene molecule has surprisingly little influence on the polarity of the molecule, it influences the electronic structure of dye significantly. The halochromic color change remains relatively the same showing a transition from yellow through green to blue upon deprotonation while the pKa of the modified dyes is significantly increased. The pKa values were determined through pH-titration of the dyes while measuring UV-VIS absorbance spectra at regular intervals. By plotting the absorbance at both maxima roughly around 430 nm (yellow, low pH) and 610 nm (blue, high pH), the pKa can be calculated at the intersection of both curves. The incorporation of styrene moieties increased the pKa from 7.4 for BTB to 8.02 for BTB-Sty and 10.59 for BTB-Sty$^2$. Alternatively, the pKa values of the modified dyes could be estimated/determined through molecular modelling, which were in good agreement with the experimental values.

Figure 6:
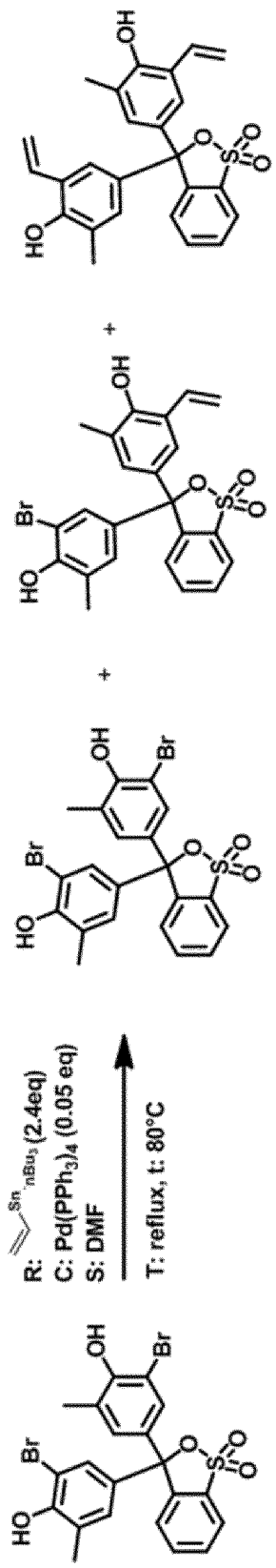
FIG. 6 represents the synthetic scheme of the Stille coupling of Bromocresol Purple with tributylvinyltin.

[E] Sulfonphtalein dyes carrying aryl-halide substituents, such as Chlorophenol Red (CPhR), Bromophenol Blue (BPhB), Bromocresol Purple (BCP), Bromocresol Green (BCG) and Bromothymol Blue 5 (BTB), can also be modified via a Stille Coupling with tributylvinyltin which allows the incorporation of a vinyl group through a Pd-based catalytic cycle. This reaction is similar to the Suzuki coupling discussed previously [D] for the modification of sulfonphtalein dyes (e.g. BTB) with the difference that a tin derivative is used instead of a boronic acid (FIG. 6) and allows the incorporation of a single vinyl moiety.

By using the less sterically hindered BCP and an excess of the tin reagent, overnight reaction showed just two compounds including the double reacted BCP-vinyl$^2$ product and residual starting compound as determined using LC-MS. The mixture was purified by filtering off the Pd(PPh$_3$)$_4$, evaporation of the DMF after which the BCP derivatives were extracted from an acidified aqueous solution using EtOAc. A radical inhibitor was added and the temperature was lowered to 80° C. in order to limit the spontaneous initiation of the formed styrene moiety.

For instance, 0.2502 g of Bromocresol Purple (0.46 mmol, 1 eq) and 0.0295 g of Pd(PPh$_3$)$_4$ (0.02 mmol, 0.05 eq) were dissolved in 10 mL of DMF (0.12 mol) which was bubbled with Ar for 30 min. A spatula point of phenothiazine was added to prevent self-initiation of the formed styrene moiety. 0.31 mL tributyl(vinyl)tin (1.10 mmol, 2.4 eq) was added after which the reaction was heated to 80° C. and stirred overnight. The reaction was purified by evaporating of the DMF through azeotropic evaporation with toluene after which the crude product was purified using column chromatography (silica, MeOH/DCM 1/5) revealing a deep red solid after evaporation. A mixture of both BCP and BCP-vinyl$^2$ was used in the fabrication of halochromic materials. The addition of an excess of tributylvinyl reagent caused the predominant formation of BCPvinyl$^2$ in the presence of unreacted BCP allowing its use in the plasma dye coating experiments. Equimolar addition of tributylvinyltin showed almost equivocal formation of BCPvinyl in the presence of BCP, which can be further purified using reverse phase preparative HPLC Example 2: Fabrication of Halochromic Materials by Plasma Dye Coating (PDC)

The fabrication of halochromic or colored materials is discussed involving the generation of surface radicals through plasma surface modification (PSM) and immediate dye immobilization through covalent bond formation. Referring to FIG. 1, in a first step, the polymerizable dye, i.e. a dye modified with a polymerizable or radical sensitive functional group, is deposited onto the material surface by dipping the material into a solution of the desired dye in a suitable solvent, preferably a volatile solvent. After a quick drying of the material in a vacuum oven to remove residual solvent, in a second step, the (surface of the) material is treated in non-thermal plasma for a short period of time to allow the covalent immobilization of the dye through radical addition with the generated surface radicals. The plasma treatment is preferentially performed on both sides of the sample to ensure full exposure of the material surface to the plasma and maximize the immobilization. In a third step, any residual, unreacted dye or plasma induced by-products are removed through an extraction step, in particular a soxhlet extraction step (FIG. 1).

The loading of the dye on the material surface was maximized by optimizing several process parameters, in particular dipping time and dye concentration in the dipping solution, plasma treatment time (see section a) below) and finally the identity of the radical sensitive group (see section b) below). DR1 was chosen as dye in this optimization phase because of its strong color and the variability of the functional group (see [A] above) and its high solubility in various common organic solvents. Since DR1 and its derivatives are well soluble in THF, this solvent was used in both the dipping step and the soxhlet extraction. The material of choice for this optimization was electrospun PA6 which allows the determination of the dye loading by solution UV-VIS spectroscopy in a formic acid/acetic acid solvent mixture (FA/AA) after dissolution of the fibrous material. Using the extension coefficient of DR1 in FA/AA 1/1 calculated from a calibration curve, the obtained absorbance can be translated into nmol/cm$^2$ using the Lambert-Beer law. In order to increase the quality of our investigation, all tests were performed on a 1 cm$^2$ piece of material in triplicate taking into account that the obtained dye loading on the surface can be used as a relative value but is most likely an underestimation due to removal of colored material during the filtration of the acidic polymer solution.

a) Optimization of the Plasma Dye Coating (PDC) Procedure

In a first experimental setup, the dipping time or the dipping concentration of the first step of the procedure was varied. DR1-allyl was dissolved in THF with a concentration ranging from 10 to 100 mg/mL after which the PA6 sample (1 cm$^2$) was dipped into the dye solution for 1 to 60 min. The treated PA6 samples were subsequently dried in a vacuum oven for 30 min and plasma treated for 10 minutes on both sides. Next, the materials were placed in a soxhlet extractor with THF for at least 12 h, dried to remove traces of THF and solubilized in FA/AA 1/1 for UV-VIS spectroscopy measurements and dye-loading determination.

Results showed a similar trend for both dipping time and dipping concentration with a steep increase in dye loading at short times and low concentrations, after which the dye loading seems to level off. The results show that the dye loading reaches a plateau at respectively 25 mg/ml dipping concentration and 1 min dipping time fairly quickly. This behavior is probably related to the large spatial stability of the polymeric base material showing little swelling in THF and resulting fast saturation of the surface with dye. In this experimental setup, the coating step is, therefore, considered to be optimal with a dipping time of just one minute in a dipping solution containing 25 mg/mL of dye. These parameters allow for a relatively high dye loading while limiting both time and spent resources during the first step of the PDC procedure. These conditions may however be substrate material specific.

Figure 7:
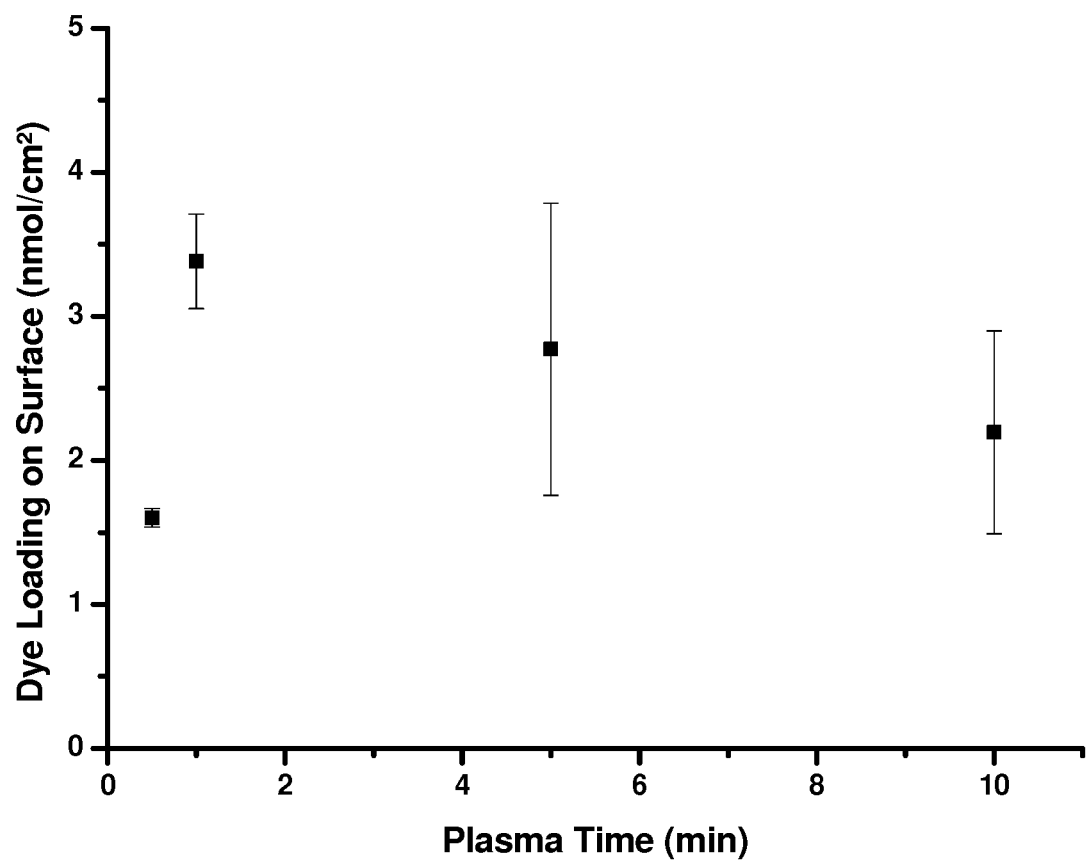
FIG. 7 represents the dye loading on PA6 surface after plasma treatment measured by UV-VIS spectroscopy in function of plasma treatment time on a single side.

In a second experimental setup, the effect of the plasma time was optimized as this controls the balance between dye immobilisation and material/dye degradation. The evolution of the dye loading in function of the plasma treatment time on a single side is shown in FIG. 7 and visualizes this balance between immobilisation and degradation. Initially, the dye loading increases as dye immobilization is dominant obtaining a maximum at about 1 min. At longer plasma treatment time, the degradation becomes more important resulting in a steady decrease of dye loading. This trend is even visually noticeable with the strong orangey-red color of the material after soxhlet for the 1 min sample fading and turning more brown with increasing plasma treatment time, indicative of dye degradation (not shown).

In conclusion, in this experimental setup, an optimized PDC procedure for the immobilization of DR1-allyl on PA6 was obtained with the following parameters: PA6 is dipped into a 25 mg/mL solution of DR1-A in THF for 1 min. The treated sample is dried, first briefly in air, next completely in a vacuum oven at 40° C. for 30 min. The samples are then positioned in the plasma chamber on a glass surface and placed under 0.8 mBar of Ar pressure. After 1 min of plasma treatment, the chamber is opened to the air and the pieces are flipped over and treated again for 1 min. The material is finally purified via (soxhlet) extraction using the same solvent as the dipping solution.

b) Influence of the Presence/Nature of the Polymerizable or Radical Sensitive Group The optimized parameters of the PDC procedure of section a) above were used to assess the influence of the presence and identity of the radical sensitive group. Different Disperse Red 1 derivatives (as made in Example [A] above) were subject to a plasma treatment and analysed by UV-VIS spectroscopy.

Figure 8:
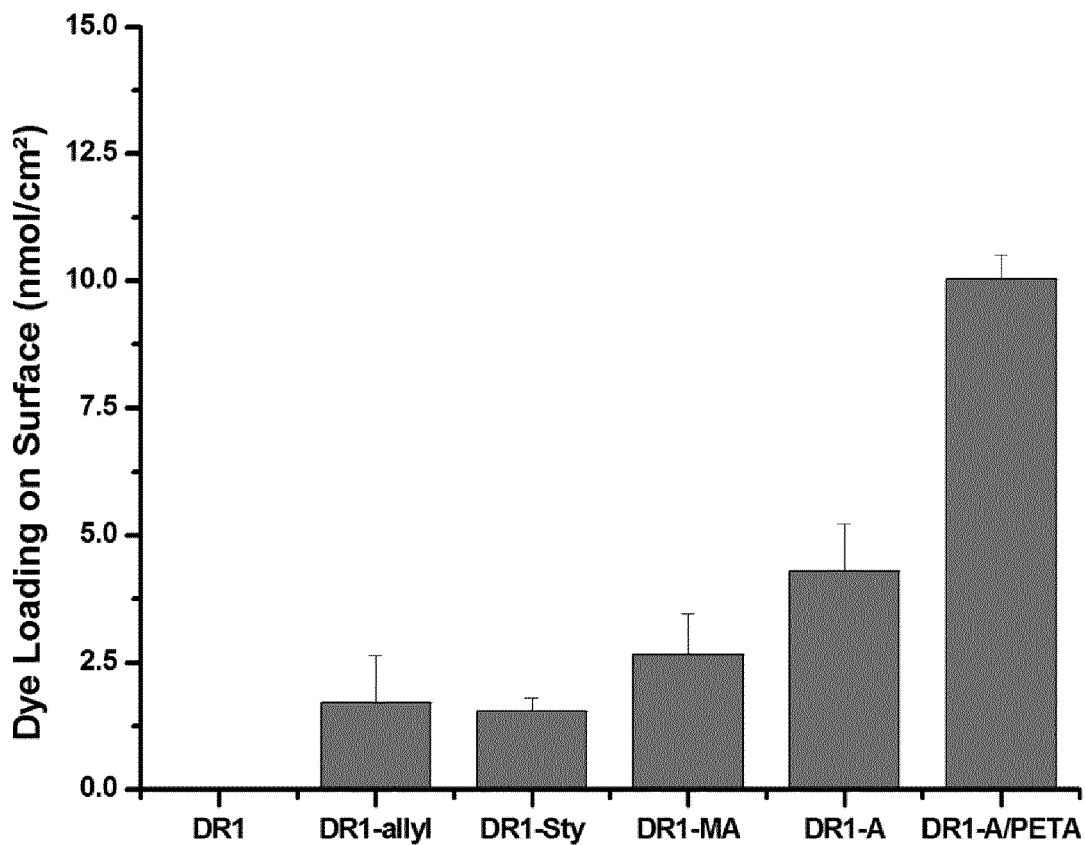
FIG. 8 represents the dye loading on a PA6 surface after plasma treatment measured by UV-VIS spectroscopy using dyes with varying polymerizable functional groups. DR1 without a polymerizable functional group was used as the control.
Figure 9:
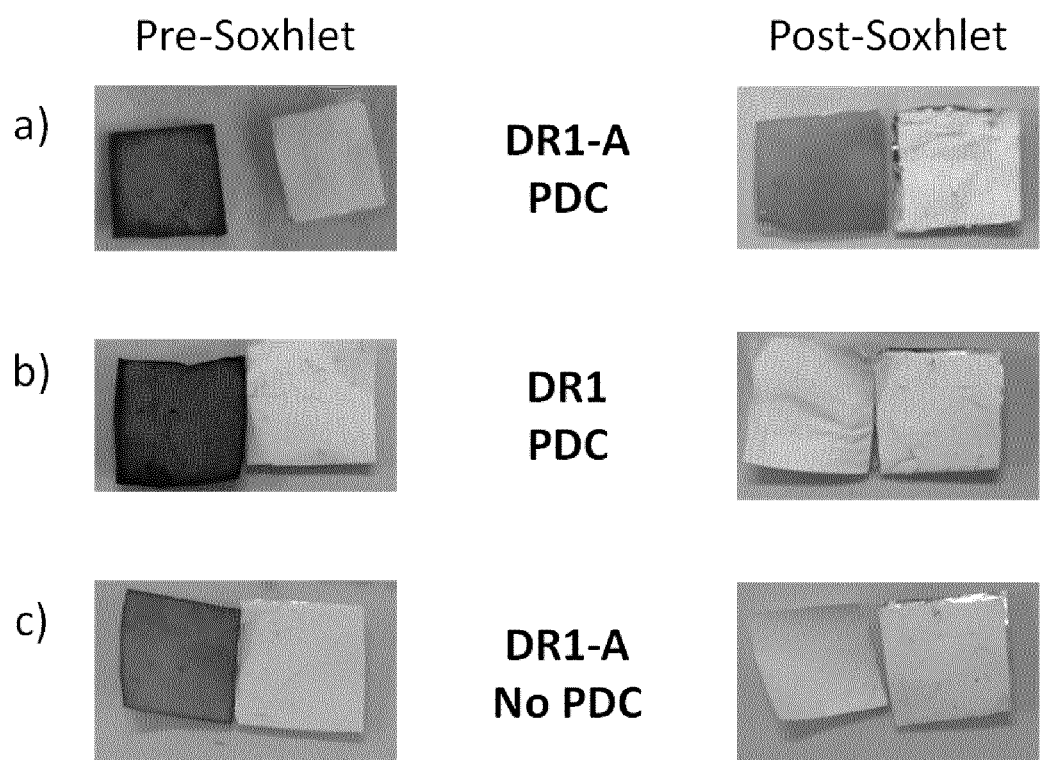
FIG. 9 is a visual representation of the comparison of the plasma dye coating (PDC) of a PA6 sample and a polymerizable dye, using the optimized parameters, according to an embodiment of the present (sample a), with an altered PDC procedure, in particular wherein the dye does not comprise a polymerizable group (comparative example b) or where the sample was not subjected to a plasma treatment (comparative example c). All pictures are taken adjacent to an untreated piece of PA6, i.e. a piece of PA6 which was not brought into contact with a dye solution.

As can be seen in FIGS. 8 and 9, the presence of the radical sensitive group is very important for the successful immobilization of the DR1 dye onto the material surface. In a comparative example, without the radical sensitive polymerizable moiety, little if any dye remained on the PA surface after plasma treatment. Without being bound by theory, the Ar plasma most likely interacts with the aromatic structure of the unmodified Disperse Red 1 dye, leading to fragmentation or dye structure degradation, and loss of optical properties.

Indeed, the importance of the combination of a polymerizable dye and the plasma surface treatment is visualized in FIG. 9. The first row (FIG. 9(a)) depicts the PDC treatment of PA6 with DR1-A, according to the present invention, using the optimized conditions discussed previously, showing a nice orange color after soxhlet extraction. Removing either the polymerizable functional group (see comparative example depicted in FIG. 9(b)) or the plasma treatment (see comparative example depicted in FIG. 9(c)) no distinguishable dye immobilization was observed after soxhlet extraction.

Dye loading of the PA sample surface was also dependent on the identity of the introduced radical sensitive group. Although the current procedure allows the immobilization of all functionalized dyes (allyl, styrenoyl, acrylic or methacrylic derivatives of DR1), DR1-A was incorporated most effectively. The different radical stability in each polymerizing group is most likely reflected in the optimum plasma treatment time. Finally, the dye loading could be increased by the addition of the radical cross-linker pentaerythritol tetraacrylate (PETA) in a 50 mg/mL concentration into the dipping solution. This additive not only promotes the dye loading through an increased reaction of surface radicals with the polymerizable functional groups of the dye, it also cross-linked the PA nanofibers, but also drastically changes the material properties including a decrease in solubility, which may not be desired in certain applications.

The radical nature of the dye immobilization and the resulting covalent bond should suppress all leaching at any pH with hydrolytically stable dyes. This was analyzed by performing a water fastness test to a water bath and comparing a DR1-doped PA6 sample to a PDC treated sample with the hydrolytically stable DR1-MA or DR1-Sty. Both of these samples showed no significant leaching (<2%) to a water bath at any pH, proving the reduced dye leaching through PDC.

c) Expanding the Material and Dye Range

Various materials and dyes were selected for the plasma based coloring process.

Different functionalized dyes (DR1-A, 4-N,N'dimethyl-amino-1,8-acrylamidoethylnaphthilimide (DMAAENI), Rose Bengal-styrene (RB-Sty), Bromocresol Purple-double vinyl (BCP-Vinyl$^2$) and Bromothyl Blue modified with a single styrene moiety (BTB-Sty) were chosen and include relatively simple azobenzene dyes to complex sulphonphtaleins. While DR1-A and DMAAENI are well soluble in THF at room temperature, the other three dyes required the use of ethanol in both the dipping step and the soxhlet extraction/washing step.

The materials were selected in order to include highly adsorbent materials including PA6 and cellulose but also more resistant materials like low and high density polyethylene (LDPE-HDPE), polypropylene (PP) and polytetrafluoroethylene (PTFE). Due to the low adsorption of the latter three materials, an extra plasma treatment step was included in the PDC procedure prior to the dipping in order to ensure the homogenous distribution and adsorption of the dye on the material surface. This experiment was designed to investigate the applicability of the PDC method and was evaluated in a qualitative comparative way (i.e. via pictures).

The results are represented in Table 1 and show the wide applicability of the PDC procedure. Although all material and dye combinations are uniformly colored after soxhlet extraction, the color intensity of the treated samples varies.

The PDC procedure as optimized in Example 2, seems to be most effective for the highly absorptive materials cellulose and PA6, showing a relatively strong, homogenous coloration for all dyes. The pre-treatment of the other materials (PE, PP, PTFE) increased the color intensity of the samples and also allowed for the homogeneous distribution of the dye on the material surface. Indeed, particularly for the very inert materials like untreated PP and PTFE, the dye solution had the tendency to form beads on the surface and collect on the edges without any significant absorption. Finally, when comparing the dyes it is obvious that the best results are obtained with DR1-A, which is expected as the PDC procedure was optimized with it.

TABLE 1 color intensity of samples treated with different dyes
(+++ intense coloration; ++ moderate coloration; + weak coloration)

| Materials | Functionalized dyes | | | | |
|---|---|---|---|---|---|
| | DR1-A | DMAAENI | RB-Sty | BCP-vinyl$^2$ | BTB-Sty |
| Polyamide6 | +++ | +++ | +++ | +++ | +++ |
| Cellulose | +++ | +++ | +++ | +++ | +++ |
| Pre-treated polypropylene | ++ | ++ | +++ | ++ | + |
| Pre-treated Teflon (PTFE) | ++ | ++ | + | + | + |
| Pretreated LDPE | ++ | + | + | + | + |
| Pretreated HDPE | ++ | + | + | + | n.d. |

In general, the PDC procedure allows immobilizing a large variety of dyes and polymerizable groups on several materials. Presumably, the process parameters are both material and dye specific: the dye loading for the other combinations besides PA6/DR1-A may be increased through further procedural optimization.

d) Effect of the PDC Treatment on Surface Properties of the Sample Materials

The effect of the plasma treatment and dye immobilization on the material surface was investigated by comparing the hydrophilicity of treated and untreated samples using contact angle measurements. Values for untreated surfaces were compared to samples modified with the hydrophobic DR1 and the hydrophilic RB, immobilized using the PDC procedure. A drop of MilliQ water was placed on each surface after which the contact angle was determined after 5 sec, averaged over five drops per sample. The results show that for most of the materials the influence of the PDC procedure on the surface properties is limited with no drastic change in the contact angles (A<100) or no noticeable trend due to the incorporation of a specific hydrophobic (DR1) or hydrophilic dye (RB). The biggest difference is noticed for LD-PE showing a large decrease in contact angle for both PDC samples. This could be explained by the incorporation of oxygen species (alcohols or peroxide) upon opening of the plasma chamber to the air after PDC treatment. Alternatively, the use of organic solvents or increased temperature of the soxhlet solvent could have influenced the surface properties as it clearly affects the density and rigidity of the LD-PE.

In addition, as the plasma treatment is a highly energetic modification techniques, the effect on the structural integrity and surface characteristics was investigated by scanning electron microscopy (SEM). No significant influence of the plasma treatment on the surface was observed.

Example 3: Sensor Design

This post-fabrication modification approach allows the irreversible coloring of the material with drastically reduced leaching. By careful design of the employed dye, an extra responsivity could be bestowed onto the material surface allowing the use of the PDC procedure for the synthesis of various sensor materials. The use of pH-responsive dyes allows for the fabrication of halochromic materials with drastically reduced dye leaching for several applications. This color change in function of pH was illustrated using DR1-A/cellulose; RB-Sty/cellulose; BCP-allyl$^2$/cellulose and BTB-Sty/PA6. The color switch of the first three examples was induced by the application of HCl or $NH_3$ saturated vapors due to the extreme pKa of the immobilized DR1 and RB (pKa 0-1). The final sample of BTB-Sty/PA6 was investigated by adding distilled water and aqueous NaOH solution (pH 13). All samples showed the desired quick and reversible homogenous color change, which makes these materials and the PDC procedure applicable for the fabrication of halochromic sensors.

In conclusion, a new post-fabrication modification approach for the fabrication of colored materials has been developed based on the cross-linking of an adsorbed polymerizable dye to the surface of a material through plasma surface modification. The plasma dye coating procedure shows successful immobilization for various dye (functionalized with a polymerizable functional group)—material combinations. This allows the creation of colored materials without the need of interfering with the fabrication method, opening the way for various sensor materials. With this post-fabrication approach a single procedure can be used for applying a dye to a wide variety of materials including PA-6 and cellulose but also more inert materials like PE and PTFE. Other advantages include the low amount of dye required, the reduced dye leaching the short treatment time and the possibility of a continuous modification process. Finally, the use of atmospheric pressure plasma generators could increase the economic potential of this PDC procedure even further.

The invention claimed is:

1. A colored object wherein a surface of the object is colored with a functionalized coloring agent,
   wherein said functionalized coloring agent comprises a coloring agent linked to an organic moiety comprising a polymerizable functional group or a thiol group,
   wherein said polymerizable functional group comprises a substituted or unsubstituted alkenyl or alkynyl moiety, and
   wherein the surface of the colored object is covalently linked to the functionalized coloring agent via the polymerizable functional group or the thiol group of said functionalized coloring agent.

2. The object of claim 1, wherein only the surface of the product is colored.

3. A halochromic, solvatochromic, thermochromic or photochromic sensor comprising the colored object according to claim 1.

4. The sensor of claim 3, for monitoring the shelf life of food products, wherein said sensor is a halochromic sensor.

5. The sensor of claim 3, wherein the food products comprise meat and fish products.

6. The sensor of claim 3, wherein said sensor serves as a monitor for shelf life of food products.

7. The sensor of claim 3, wherein said polymerizable functional group comprises vinyl, vinyl ether, allyl, acryloyl, methacryloyl, acrylamidoyl, methacrylamidoyl, maleimidyl, propargyl or styrenoyl moiety.

8. The sensor of claim 3, wherein said coloring agent comprises a halochromic dye, a solvatochromic dye, a thermochromic dye or a photochromic dye.

9. A wound dressing comprising a colored carrier comprising:
- i) a carrier comprising a surface made up of an organic polymeric material; and
- ii) a functionalized coloring agent comprising a coloring agent linked to an organic moiety comprising a polymerizable functional group or a thiol group, wherein said polymerizable functional group is a substituted or unsubstituted alkenyl or alkynyl moiety, wherein the surface of the carrier is covalently linked to the functionalized coloring agent; and wherein the colored carrier is incorporated into a wound dressing.

10. The wound dressing of claim 9, wherein the coloring agent comprises a halochromic dye, a solvatochromic dye, a thermochromic dye or a photochromic dye.

11. The wound dressing of claim 9, wherein the coloring agent comprises a halochromic dye.

12. The wound dressing of claim 11, wherein said halochromic dye has a pKa value between 6 and 8.

13. The wound dressing of claim 9, wherein said polymerizable functional group comprises a vinyl, vinyl ether, allyl, acryloyl, methacryloyl, acrylamidoyl, methacrylamidoyl, maleimidyl, propargyl or styrenoyl moiety.

14. A safety product comprising a colored object comprising:
- i) an object comprising a surface made up of an organic polymeric material; and
- ii) a functionalized coloring agent comprising a coloring agent linked to an organic moiety comprising a polymerizable functional group or a thiol group, wherein said polymerizable functional group comprises a substituted or unsubstituted alkenyl or alkynyl moiety, wherein the surface of the object is covalently linked to the functionalized coloring agent; and wherein the colored object is incorporated into the safety product.

15. The safety product of claim 14, wherein the coloring agent comprises a halochromic dye, a solvatochromic dye, a thermochromic dye or a photochromic dye.

16. The safety product of claim 14, wherein said safety product comprises a textile product.

17. The safety product of claim 14, wherein said colored object comprises a fiber, fabric or textile.

18. The safety product of claim 14, wherein the safety product comprises protective clothing.

19. The safety product of claim 14, wherein said polymerizable functional group comprises a vinyl, vinyl ether, allyl, acryloyl, methacryloyl, acrylamidoyl, methacrylamidoyl, maleimidyl, propargyl or styrenoyl moiety.

20. The safety product of claim 14, wherein the safety product detects acidic or alkaline vapors.

* * * * *